United States Patent
Vasanth

(10) Patent No.: US 12,267,366 B2
(45) Date of Patent: Apr. 1, 2025

(54) SYSTEM AND METHOD FOR SCHEDULING VIRTUAL MACHINES BASED ON SECURITY POLICY

(71) Applicant: Nutanix, Inc., San Jose, CA (US)

(72) Inventor: Ashwini Vasanth, West Lafayette, IN (US)

(73) Assignee: Nutanix, Inc., San Jose, CA (US)

( * ) Notice: Subject to any disclaimer, the term of this patent is extended or adjusted under 35 U.S.C. 154(b) by 291 days.

(21) Appl. No.: 17/569,278

(22) Filed: Jan. 5, 2022

(65) Prior Publication Data
US 2023/0164188 A1    May 25, 2023

Related U.S. Application Data

(60) Provisional application No. 63/282,112, filed on Nov. 22, 2021.

(51) Int. Cl.
*H04L 9/40* (2022.01)
*G06F 9/455* (2018.01)

(52) U.S. Cl.
CPC .......... *H04L 63/20* (2013.01); *G06F 9/45558* (2013.01); *G06F 2009/4557* (2013.01); *G06F 2009/45587* (2013.01); *G06F 2009/45595* (2013.01)

(58) Field of Classification Search
CPC .......... H04L 63/20; G06F 9/45558; G06F 2009/4557; G06F 2009/45587; G06F 2009/45595
See application file for complete search history.

(56) References Cited

U.S. PATENT DOCUMENTS

| | | | |
|---|---|---|---|
| 8,549,518 B1 | 10/2013 | Aron et al. | |
| 8,601,473 B1 | 12/2013 | Aron et al. | |
| 8,850,130 B1* | 9/2014 | Aron | G06F 3/0685 711/150 |
| 8,863,124 B1* | 10/2014 | Aron | G06F 9/5061 718/1 |
| 9,009,106 B1* | 4/2015 | Aron | G06F 3/065 707/610 |
| 9,069,708 B2* | 6/2015 | Gill | G06F 11/1438 |
| 9,336,132 B1* | 5/2016 | Aron | G06F 3/067 |
| 9,565,129 B2* | 2/2017 | Bai | H04L 47/786 |
| 9,652,265 B1* | 5/2017 | Narayanasamy | G06F 13/10 |

(Continued)

OTHER PUBLICATIONS

Cano, Ignacio, et al. "Curator: Self-Managing Storage for Enterprise Clusters" (Mar. 27, 2017), from https://www.usenix.org/conference/nsdi17/.

(Continued)

*Primary Examiner* — Jimmy H Tran
(74) *Attorney, Agent, or Firm* — Foley & Lardner LLP

(57) ABSTRACT

An illustrative embodiment disclosed herein is an apparatus including a processor and a memory. In some embodiments, the memory includes programmed instructions that, when executed by the processor, cause the apparatus to apply a category to a first virtual machine (VM) and a second VM, schedule the first VM and the second VM to be placed on a host at least based on the first VM and the second VM including the category, and apply a security policy to the first VM and the second VM at least based on the first VM and the second VM including the category.

15 Claims, 6 Drawing Sheets

200

Apply a category to a first virtual machine (VM) and a second VM 202

Schedule the first VM and the second VM to be placed on a host at least based on the first VM and the second VM including the same category 204

Apply a same security policy to the first VM and the second VM at least based on the first VM and the second VM including the same category 206

(56) References Cited

U.S. PATENT DOCUMENTS

| | | | | |
|---|---|---|---|---|
| 9,772,866 | B1* | 9/2017 | Aron | G06F 9/45558 |
| 10,498,608 | B2* | 12/2019 | Sethi | H04L 41/0853 |
| 11,025,647 | B2* | 6/2021 | Cooper | G06F 21/606 |
| 2008/0155537 | A1* | 6/2008 | Dinda | G06F 9/5077 718/1 |
| 2012/0096271 | A1* | 4/2012 | Ramarathinam | H04L 63/168 709/227 |
| 2012/0233668 | A1* | 9/2012 | Leafe | G06F 9/44526 726/4 |
| 2013/0227560 | A1* | 8/2013 | McGrath | G06F 9/5077 718/1 |
| 2013/0227561 | A1* | 8/2013 | Walsh | G06F 21/53 718/1 |
| 2013/0227635 | A1* | 8/2013 | Walsh | G06F 21/6218 726/1 |
| 2014/0189684 | A1* | 7/2014 | Zaslavsky | G06F 9/45533 718/1 |
| 2014/0196039 | A1* | 7/2014 | Kottomtharayil | G06F 9/505 718/1 |
| 2015/0012962 | A1* | 1/2015 | Walsh | H04L 63/20 726/1 |
| 2015/0295792 | A1* | 10/2015 | Cropper | H04L 67/10 709/226 |
| 2015/0319160 | A1* | 11/2015 | Ferguson | H04L 63/12 726/10 |
| 2015/0341318 | A1* | 11/2015 | Lee | H04L 63/20 726/11 |
| 2016/0321095 | A1* | 11/2016 | Cropper | H04L 41/0893 |
| 2016/0342436 | A1* | 11/2016 | Cropper | G06F 9/45558 |
| 2017/0024260 | A1* | 1/2017 | Chandrasekaran | G06F 9/45558 |
| 2017/0093918 | A1* | 3/2017 | Banerjee | H04L 41/0895 |
| 2017/0134422 | A1* | 5/2017 | Shieh | H04L 63/1408 |
| 2017/0220376 | A1* | 8/2017 | Cropper | G06F 1/3203 |
| 2017/0371717 | A1* | 12/2017 | Kiess | G06F 9/5077 |
| 2018/0046807 | A1* | 2/2018 | Patil | H04L 43/0817 |
| 2018/0074670 | A1* | 3/2018 | Cropper | G06F 3/0484 |
| 2018/0074838 | A1* | 3/2018 | Cropper | H04L 41/5025 |
| 2018/0176261 | A1* | 6/2018 | Bansal | H04L 41/0893 |
| 2018/0285166 | A1* | 10/2018 | Roy | G06F 9/5016 |
| 2019/0158541 | A1* | 5/2019 | Miriyala | H04L 63/205 |
| 2019/0171491 | A1* | 6/2019 | Das | G06F 9/5077 |
| 2019/0230064 | A1* | 7/2019 | Soman | H04L 63/0263 |
| 2019/0342335 | A1* | 11/2019 | Ni | H04L 41/0895 |
| 2019/0361727 | A1* | 11/2019 | Thakkar | H04L 9/3268 |
| 2019/0392150 | A1* | 12/2019 | Shevade | H04L 61/2517 |
| 2020/0167184 | A1* | 5/2020 | Kouznetsov | G06F 9/5033 |
| 2020/0201664 | A1* | 6/2020 | Panse | G06F 9/45558 |
| 2020/0201665 | A1* | 6/2020 | Panse | G06F 9/5077 |
| 2020/0244702 | A1* | 7/2020 | Ambardekar | H04L 63/0263 |
| 2020/0366572 | A1* | 11/2020 | Chauhan | H04L 41/5009 |
| 2020/0366697 | A1* | 11/2020 | Vittal | G06F 21/62 |
| 2021/0184977 | A1* | 6/2021 | Testicioglu | H04L 47/11 |
| 2021/0224088 | A1* | 7/2021 | Wiggers | G06F 8/34 |
| 2021/0227023 | A1* | 7/2021 | Wiggers | G06F 9/5077 |
| 2022/0014500 | A1* | 1/2022 | Xu | H04L 63/0428 |
| 2022/0237048 | A1* | 7/2022 | Wiggers | G06F 9/5027 |
| 2022/0237049 | A1* | 7/2022 | Wiggers | G06F 9/5077 |
| 2022/0303246 | A1* | 9/2022 | Miriyala | H04L 41/0806 |
| 2023/0125661 | A1* | 4/2023 | Jebakumar | G06F 9/4856 718/1 |

OTHER PUBLICATIONS

Create NSX security groups and policies—Deep Security, https://help.deepsecurity.trendmicro.com/10/0/Reference/ref-create-vmw-grps.html, 8 pages.

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Oct. 15, 2013), from http://stevenpoitras.com/the-nutanix-bible/ (Publication date based on indicated capture date by Archive.org; first publication date unknown).

Poitras, Steven. "The Nutanix Bible" (Sep. 17, 2019), from https://nutanixbible.com/.

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 9, 2015), from http://stevenpoitras.com/the-nutanix-bible/ (Publication date based on indicated capture date by Archive.org; first publication date unknown).

VMware, Inc., "Performance of vSphere 6.7 Scheduling Options," Performance Study (Apr. 11, 2019), https://www.vmware.com/content/dam/digitalmarketing/vmware/en/pdf/techpaper/performance/scheduler-options-vsphere67u2-perf.pdf, 1-17 pages.

VMware, Inc., "Virtual Machine Affinity and Anti-Affinity," (May 31, 2019), https://docs.vmware.com/en/VMware-Cloud-Director/9.7/com.vmware.vcloud.user.doc/GUID-103BE81A-0762-45C6-915D-19B2B75DEE05.html, 1-3 pages.

"Create NSX security groups and policies|Deep Security," https://help.deepsecurity.trendmicro.com/10/0/Reference/ref-create-vmw-grps.html, pp. 1-8.

VMware, "Performance of vSphere 6.7 Scheduling Options," (Apr. 11, 2019), https://www.vmware.com/content/dam/digitalmarketing/vmware/en/pdf/techpaper/performance/scheduler-options-vsphere67u2-perf.pdf, pp. 1-17.

VMware, "Virtual Machine Affinity and Anti-Affinity," (May 31, 2019), https://docs.vmware.com/en/VMware-Cloud-Director/9.7/com.vmware.vcloud.user.doc/GUID-103BE81A-0762-45C6-915D-19B2B75DEE05.html, pp. 1-3.

* cited by examiner

200

Apply a category to a first virtual machine (VM) and a second VM 202

Schedule the first VM and the second VM to be placed on a host at least based on the first VM and the second VM including the same category
204

Apply a same security policy to the first VM and the second VM at least based on the first VM and the second VM including the same category
206

SYSTEM AND METHOD FOR SCHEDULING VIRTUAL MACHINES BASED ON SECURITY POLICY

CROSS-REFERENCE TO RELATED APPLICATION

This application is related to and claims priority under 35 U.S. § 119(e) the U.S. Provisional Patent Application No. 63/282,112, filed Nov. 22, 2021, titled "A SYSTEM AND METHOD FOR SCHEDULING VIRTUAL MACHINES BASED ON SECURITY POLICY," the entire contents of which are incorporated herein by reference for all purposes.

BACKGROUND

Micro-segmentation is a network security technique that can enable security architects to logically divide a data center into distinct security segments and define security controls and deliver services for each unique segment. Micro-segmentation can enable infrastructure technology (IT) to deploy flexible security policies inside a data center using network virtualization technology instead of installing multiple physical firewalls.

SUMMARY

Aspects of the present disclosure relate generally to a computing environment, and more particularly to a system and method for scheduling virtual machines based on security policy.

An illustrative embodiment disclosed herein is an apparatus including a processor and a memory. In some embodiments, the memory includes programmed instructions that, when executed by the processor, cause the apparatus to apply a category to a first virtual machine (VM) and a second VM, schedule the first VM and the second VM to be placed on a host at least based on the first VM and the second VM including the category, and apply a security policy to the first VM and the second VM at least based on the first VM and the second VM including the category.

Another illustrative embodiment disclosed herein is a non-transitory computer readable storage medium. In some embodiments, the medium includes instructions stored thereon that, when executed by a processor, cause the processor to apply a category to a first virtual machine (VM) and a second VM, schedule the first VM and the second VM to be placed on a host at least based on the first VM and the second VM including the category, and apply a security policy to the first VM and the second VM at least based on the first VM and the second VM including the category.

Another illustrative embodiment disclosed herein is a method including applying a category to a first virtual machine (VM) and a second VM, scheduling the first VM and the second VM to be placed on a host at least based on the first VM and the second VM including the category, and applying a security policy to the first VM and the second VM at least based on the first VM and the second VM including the category.

An illustrative embodiment disclosed herein is an apparatus including a processor and a memory. In some embodiments, the memory includes programmed instructions that, when executed by the processor, cause the apparatus to apply a category to a first virtual machine (VM) hosted on a first host and a second VM hosted on a second host, migrate one of the first VM or the second VM such that the first VM and the second VM are on a same host at least based on the first VM and the second VM including the category, and apply a security policy to the first VM and the second VM at least based on the first VM and the second VM including the category.

Another illustrative embodiment disclosed herein is a non-transitory computer readable storage medium. In some embodiments, the medium includes instructions stored thereon that, when executed by a processor, cause the processor to apply a category to a first virtual machine (VM) hosted on a first host and a second VM hosted on a second host, migrate one of the first VM or the second VM such that the first VM and the second VM are on a same host at least based on the first VM and the second VM including the category, and apply a security policy to the first VM and the second VM at least based on the first VM and the second VM including the category.

Another illustrative embodiment disclosed herein is a method including applying a category to a first virtual machine (VM) hosted on a first host and a second VM hosted on a second host, migrating one of the first VM or the second VM such that the first VM and the second VM are on a same host at least based on the first VM and the second VM including the category, and applying a security policy to the first VM and the second VM at least based on the first VM and the second VM including the category.

Further details of aspects, objects, and advantages of the disclosure are described below in the detailed description, drawings, and claims. Both the foregoing general description and the following detailed description are exemplary and explanatory and are not intended to be limiting as to the scope of the disclosure. Particular embodiments may include all, some, or none of the components, elements, features, functions, operations, or steps of the embodiments disclosed above. The subject matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

Figure 1:
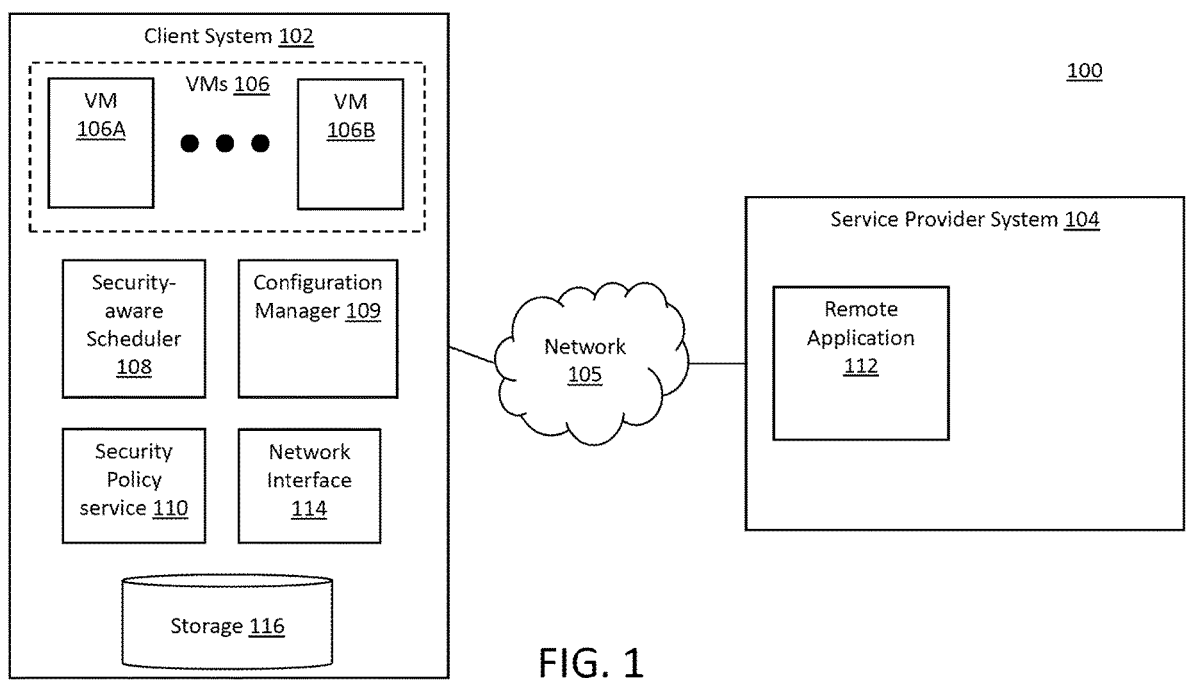
FIG. 1 illustrates a system for scheduling based on a security policy, in accordance with some embodiments.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Network security rules such as micro-segmentation rules are designed to protect virtual machines (VMs) from certain types of network traffic. However, the placement of the VMs on hosts can have an impact on time required to apply the network security rules and make the rules operational. In embodiments lacking the improvements disclosed herein, the system can distribute a group of VMs on different hosts with an intent of applying same security rules to each VM in the group. This distribution may be by default or by chance. Such systems may need to program every host which contains a VM from the group, which would consume unnecessary time and resources. This problem can be exacerbated as the network security policies and number of hosts scale.

Disclosed herein are embodiments of a system and method for security-aware scheduling and migrating. In some embodiments, the system places all the VMs to which a network security policy applies, or will apply, on a same host. The system can find the VMs which share an attribute and prioritize placing them on the same host. In some embodiments, after the VMs have network security policies applied to them, the system groups all the VMs to which a particular network security policy is applied and prioritizes placing them on a same host during VM migration events. Based on the applied policies configured and saved, the system can give a user an explicit option to migrate the VMs applying or updating the network security policy.

Advantageously, because all the VMs to which a network security rules apply can reside on the same host, the policy does not need to be distributed across multiple hosts, which reduces the time required to realize the rules and protect the VMs. A benefit is that embodiments of the disclosed system and method are scalable because as the network security policies and number of hosts increase, the time and resources saved from security-aware scheduling increases.

In some embodiments, the system and method is in accordance with a push-pull mechanism. That is, in one embodiment, one component of the system can push data to another component of the system as soon as the data is produced. For example, as soon as a configuration manager of the system categories VMs in a same category, the configuration manager pushes the category configuration to a security-aware scheduler, which schedules the VMs to be on a same host based on being in the same category such that a security a rule can be immediately applied to all of the VMs on that host. In one embodiment, one component of the system can poll the other component of the system and pull data as soon as a change such as an event is detected. The push-pull mechanism may be in contrast to systems that wait to batch data. Advantageously, using a push-pull mechanism can enable customers to achieve (near) real-time VM placement, VM migration, VM security configuration, or other VM operations. Such real-time operations may be important to prevent either a leak or a traffic drop.

FIG. 1 illustrates a system 100 for scheduling based on a security policy, in accordance with some embodiments. The system 100 includes a client system 102, a service provider system 104, and a network 105 coupling the client system 102 to the service provider system 104. In some embodiments, the client system 102 is hosted on a datacenter, an on-premises infrastructure, a cloud, a cluster of nodes (e.g., hosts, host machines, servers, etc.). The client system 102 can include one or more processors.

In some embodiments, the client system 102 includes a number of virtual machines (VMs) 106. As shown in FIG. 1, the VMs 106 include a VM 106A and a VM 106B, although the number of VMs 106 can include greater than or lesser than two VMs. A VM can refer to an entity with its own operating system and software applications. Virtual machines can run on top of a hypervisor and consume virtualized compute, storage, and network resources. In some embodiments, the client system 102 includes the hypervisor. In some embodiments, the client system 102 includes virtualized compute, storage, and network resources. In some embodiments, each of the VMs 106 include an operating system and one or more applications. In some embodiments, an application of VM 106A can include, for example, a web browser that can communicate using a network protocol with the service provider system 104.

The client system 102 includes a security-aware scheduler 108. In some embodiments, the security-aware scheduler 108 includes, or is associated with, a processor executing programmed instructions to schedule VMs having, or that will have, a same security policy (e.g., security rule, network security rule, micro-segmentation rule, etc.) on a same host. The security-aware scheduler 108 can schedule VMs having a commonality. In some embodiments, the security-aware scheduler 108 determines that the VM 106A and the VM 106B include, or are associated with, a commonality. The commonality can include one or more attributes. In some embodiments, the commonality is a type of application. For example, the security-aware scheduler 108 determines that the VM 106A and the VM 106B both include an Exchange application or a Hadoop application. In some embodiments, the commonality is a location (e.g., zone). For example, the security-aware scheduler 108 determines that the VM 106A and the VM 106B both are associated with an Eastern US zone, a Western US zone, a US zone, a European zone, etc.

In some embodiments, each of the VMs 106 can include a category associated with the respective VM. VMs can be defined by, grouped by, identified by, or otherwise associated with a category. The category can include one or more attributes. For example, a category can include one or more of an application, a type of application, a list of applications or application types, a location, or any attribute suitable for grouping VMs. In some embodiments, the commonality is the category. In some embodiments, the commonality is having multiple same attributes (e.g., application and location) even if categories are not implemented.

In some embodiments, the client system 102 includes a configuration manager 109. The configuration manager 109 can categorize the VMs 106. In some embodiments, the configuration manager 109 includes, or is associated with, a processor executing programmed instructions to configure (e.g., apply, setup, initialize, select, etc.) a category of each of the VMs 106. In some embodiments, the configuration manager 109 configures the category using an image of the VM or (other) metadata stored in the storage 116. In some embodiments, the configuration manager 109 selects attributes to be used for the category. In some embodiments, the configuration manager 109 selects attributes based on user input or policy. In some embodiments, the configuration manager 109 stores the category in the storage 116. In some embodiments, the configuration manager 109 associates the category with an image of a VM or (other) metadata of the VM stored in the storage 116.

In some embodiments, the security-aware scheduler 108 schedules the VM 106A and the VM 106B to be placed on the client system 102 (e.g., the client system 102 is a host), or a same host on the client system 102, at least based on the VM 106A and the VM 106B including the commonality. The security-aware scheduler 108 may take into consideration factors other than security. For example, the security-aware scheduler 108 schedules the VM 106A and the VM 106B to be placed on different hosts based on the VM 106A having an anti-affinity policy of not being on a same host as VM 106B. In some embodiments, the security-aware scheduler 108 schedules the VM 106A and the VM 106B to be placed the same host at least based on none of the anti-affinity policies preventing the VM 106A from being on a same host as VM 106B (e.g., when VM 106A and VM 106B have a clustered application or for high availability purposes). In some embodiments, the security-aware scheduler 108 schedules the VM 106A and the VM 106B to be placed on a same host even if VM 106A and VM 106B have different security polices at least based on VM 106A and VM 106B sending (e.g., estimated to send) to each other traffic above a threshold amount of traffic.

In some embodiments, the security-aware scheduler 108 schedules VMs 106 that are not categorized. In some embodiments, the configuration manager 109 configures the categories of the VMs 106 after the security-aware scheduler 108 schedules the VMs 106. In some embodiments, the security-aware scheduler 108 determines that the VM 106A and the VM 106B have a commonality (e.g., a same category) but are hosted on different hosts. In some embodiments, the security-aware scheduler 108 schedules the VM 106A and the VM 106B to be migrated to a host at least based on the VM 106A and the VM 106B having the commonality and being hosted on different hosts. The security-aware scheduler 108 may schedule the VM 106A and the VM 106B to be migrated before any security policy is applied to the VM 106A and the VM 106B.

In some embodiments, the security-aware scheduler 108 determines that the VM 106A and the VM 106B do not have a commonality (e.g., have different categories) but are hosted on a same host. In some embodiments, the security-aware scheduler 108 schedules one of the VM 106A or the VM 106B to be migrated to a different host at least based on the VM 106A and the VM 106B not having a commonality and being hosted on a same host.

In some embodiments, the client system 102 includes a security policy service 110. In some embodiments, the security policy service 110 includes, or is associated with, a processor executing programmed instructions to apply or update a security policy to the client system 102, or a same host on the client system 102. In some embodiments, the security policy service 110 applies a security policy to any VM that belongs to, or is associated with a commonality (e.g., a category). In some embodiments, the security policy service 110 determines the VMs that belong to the commonality and applies the security policy to the VMs that belong to the commonality. The security policy service 110 may apply the security policy responsive to the VMs being categorized, scheduled, or migrated. In some embodiments, a same processor is associated with or executes the security policy service 110 and the security-aware scheduler 108 (e.g., instructions thereof).

In some embodiments, the security policy service 110 applies the security policy to the VMs 106 before the VMs 106 are placed on the same host. In some embodiments, security policy service 110 configures security policy metadata. The security policy service 110 can store the security policy metadata in the storage 116. Responsive to the VMs 106 being placed on the same host, the security policy service 110 can apply the security policy based on the security policy metadata.

In some embodiments, the security policy includes a policy for permissible inbound traffic. For example, the security policy service 110 can permit inbound traffic (e.g., whitelist) from a number of endpoints (e.g., remote endpoints, remote applications such as the remote application 112, etc.) and prohibit inbound traffic for any remaining endpoints. The remote application 112 is described further below with respect to the service provider system 104. In some embodiments, the security policy service 110 can prohibit inbound traffic (e.g., blacklist) from a number of endpoints such as the remote application 112 and prohibit inbound traffic for any remaining remote applications.

In some embodiments, the security policy includes a policy for permissible outbound traffic. For example, the security policy service 110 can permit outbound traffic (e.g., whitelist) from a number of endpoints such as the remote application 112 and prohibit outbound traffic for any remaining endpoints. In some embodiments, the security policy service 110 can prohibit outbound traffic (e.g., blacklist) from a number of endpoints such as the remote application 112 and prohibit outbound traffic for any remaining endpoints.

The security policy service 110 can track the permitted (e.g., whitelisted) or prohibited (e.g., blacklisted) endpoints by storing one or more attributes of the permitted endpoint in a whitelist data structure (e.g., table) or a blacklist data structure, respectively. In some embodiments, the one or more attributes includes one or more of an internet protocol (IP) address, a port, a protocol, a category (e.g., a tag, a label), a type of application, or a location.

In some embodiments, the security policy includes limitations on access. For example, the security policy includes ports of the client system 102 (e.g., the network interface 114) through which traffic is permitted. The limitations may include what user is permitted to have access to the traffic or a time or day that access to the traffic is permitted.

In some embodiments, the client system 102 includes a network interface 114. The network interface 114 can permit or prohibit traffic in accordance with the security policy of the security policy service 110. For example, when a traffic is to be sent to, or received from, an endpoint, the network interface 114 compares one or more attributes of the endpoint to the one or more attributes in the whitelist data structure or the blacklist data structure. Upon finding a match between the one or more attributes of the endpoint and the one or more attributes of the whitelist data structure, the network interface 114 can permit the traffic. Upon finding a match between the one or more attributes of the endpoint and the one or more attributes of the blacklist data structure, the network interface 114 can prohibit the traffic.

The network interface 114 can include a number of ports. The network interface 114 can permit traffic access on a subset of the ports in accordance with the security policy of the security policy service 110. In some embodiments, a same processor is associated with or executes the network interface 114 and one or more of the security policy service 110 or the security-aware scheduler 108.

In some embodiments, the VMs 106 are on a first host of the client system 102 and the security-aware scheduler 108, the configuration manager 109, the security policy service 110, and the network interface 114 are on a second host of the client system 102. In some embodiments, the security-aware scheduler 108, the security policy service 110, and the network interface 114 are distributed across a number of hosts. In some embodiments, one or more of the security-aware scheduler 108, the security policy service 110, or the network interface 114 is executed in a hypervisor, a virtual machine, or a container. Containers can share the host operating system, and in some embodiments, the host binaries and libraries. Containers can be isolated from one another and the host on which the container is hosted. Containers can have their own namespace and bundle their own software applications, libraries, process identifiers (IDs), configuration files, and APIs.

In some embodiments, the service provider system 104 can be hosted by a third-party cloud service provider. The service provider system 104 can be hosted in a cloud such as a public cloud, a private cloud, a hybrid cloud, a multi-cloud, or a co-location facility. The service provider system 104 can be hosted in a private data center, or on one or more physical servers, virtual machines, or containers of an entity or customer. The service provider system 104 can be remote from the client system 102. For example, the client system 102 accesses the service provider system 104 through a public network (e.g., the network 105). The service provider system 104 can be hosted on or refer to cloud 310 depicted in FIG. 3B.

In some embodiments, the service provider system 104 includes a remote application 112. The remote application 112 can an application that accesses the client system 102 through the network 105. The remote application 112 can be a software-as-a-service ("SaaS") that executes on a server remote from the client device 102.

The network 105 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. The network 105 may include a wireless link, such as an infrared channel or satellite band. The topology of the network 105 may include a bus, star, or ring network topology. The network may include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS"), universal mobile telecommunications system ("UMTS"), long-term evolution ("LTE"), or 5G new radio ("NR"). Different types of data may be transmitted via different protocols, or the same types of data may be transmitted via different protocols.

Each of the client system 102 or the service provider system 104 can include or utilize at least one processing unit or other logic device such as programmable logic array engine, or module configured to communicate with one another or other resources or databases. The system 100 and its components can include hardware elements, such as one or more processors, logic devices, or circuits.

Figure 2A:
FIG. 2A illustrates a flowchart of an example method for security-aware scheduling, in accordance with some embodiments of the present disclosure.

Referring now to FIG. 2A, a flowchart of an example method 200 for security-aware scheduling, in accordance with some embodiments of the present disclosure. The method 200 may be implemented using, or performed by one or more of the systems (e.g., the system 100, the network environment 300, the cloud computing environment 301, or the computing device 303), one or more components (e.g., the client system 102, the security-aware scheduler 108, the configuration manager 109, the security policy service 110, the network interface 114, etc.) of one or more of the systems, or a processor associated with one or more of the systems or one or more components. Additional, fewer, or different operations may be performed in the method 200 depending on the embodiment. Additionally, or alternatively, two or more of the operations of the method 200 may be performed in parallel.

At operation 202, the processor (e.g., a processor of the client system 102) applies a category to a first virtual machine (VM) (e.g., the VM 106A) and a second VM (e.g., the VM 106B). In some embodiments, the category includes one or more of an application type, a list of application types, a location, or any attribute suitable for categorizing a VM.

At operation 204, the processor schedules the first VM and the second VM to be placed on a (same) host at least based on the first VM and the second VM including the same category. The processor can schedule the first VM and the second VM to be placed on a host at least based on the processor determining that the first VM and the second VM including a same category. In some embodiments, the processor schedules the first VM and a second VM to be placed on the host at least based on the first VM and the second VM including at least one common attribute of the category. In some embodiments, the processor schedules the first VM and a second VM to be placed on the host at least based on determining that none of the anti-affinity policies prevent the first VM and a second VM from being on the host.

At operation 206, the processor applies a same security policy to the first VM and the second VM at least based on the first VM and the second VM including the same category. The processor can apply the same security policy to the first VM and the second VM before the first VM and the second VM are placed on the host (or scheduled to be placed on the host). The processor can apply the same security policy to the first VM and the second VM after the first VM and the second VM are placed on the host (or scheduled to be placed on the host). In some embodiments, the processor applies a same security policy to the first VM and the second VM responsive to the first VM and the second VM being placed on the host (or scheduled to be placed on the host). The processor can apply the same security policy to each VM belonging to, or otherwise associated with the category, and the processor can determine that the first VM and the second VM belong to, or are otherwise associated with, the category. In some embodiments, the security policy includes at least one of a policy identifying permissible inbound traffic or a policy identifying permissible outbound traffic. In some embodiments, the processor performs the method 200 in accordance with a push-pull mechanism.

Figure 2A:
Figure 2B:
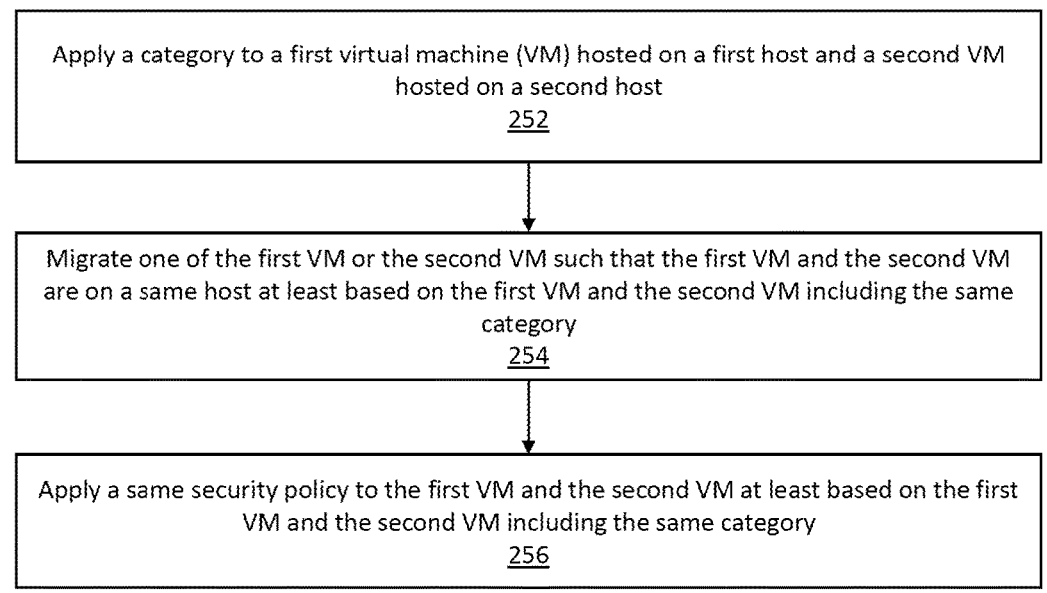
FIG. 2B illustrates a flowchart of an example method for security-aware migrating, in accordance with some embodiments of the present disclosure.

Referring now to FIG. 2B, a flowchart of an example method 250 for security-aware migrating, in accordance with some embodiments of the present disclosure. The method 250 may be implemented using, or performed by one or more of the systems (e.g., the system 100, the network environment 300, the cloud computing environment 301, or the computing device 303), one or more components (e.g., the client system 102, the security-aware scheduler 108, the configuration manager 109, the security policy service 110, the network interface 114, etc.) of one or more of the systems, or a processor associated with one or more of the systems or one or more components. Additional, fewer, or different operations may be performed in the method 250 depending on the embodiment. Additionally, or alternatively, two or more of the operations of the method 250 may be performed in parallel. One or more of the operations or embodiments of the method 250 can be combined with one or more of the operations of the method 200.

At operation 252, the processor (e.g., a processor of the client system 102) applies a category to a first virtual machine (VM) and a second VM. In some embodiments, the first VM is hosted on a first host and the second VM is hosted on a second host. In some embodiments, the first VM and the second VM were scheduled to (e.g., placed on) their respective hosts before the processor applied the category. In some embodiments, the processor scheduled the VMs to their respective hosts before the processor applied the category. In some embodiments, the processor determines that the first VM is on the first host and the second VM is on the second host.

At operation 254, the processor migrates (e.g., schedules migration of) one of the first VM or the second VM such that the first VM and the second VM are on a same host. For example, the VM 106A is on the host of the client system 102 and the processor can migrate the VM 106B to the host of the client system 102. In some embodiments, the processor migrates one of the first VM or the second VM such that the first VM and the second VM are on a same host at least based on the first VM and the second VM including the same category.

At operation 256, the processor applies a same security policy to the first VM and the second VM at least based on the first VM and the second VM including the same category. In some embodiments, the processor applies a same security policy to the first VM and the second VM after migrating the one of the first VM or the second VM such that the first VM and the second VM are on a same host. In some embodiments, the processor applies a same security policy to the first VM and the second VM responsive to migrating the one of the first VM or the second VM such that the first VM and the second VM are on a same host. In some embodiments, the processor performs the method 250 in accordance with a push-pull mechanism.

Figure 3A:
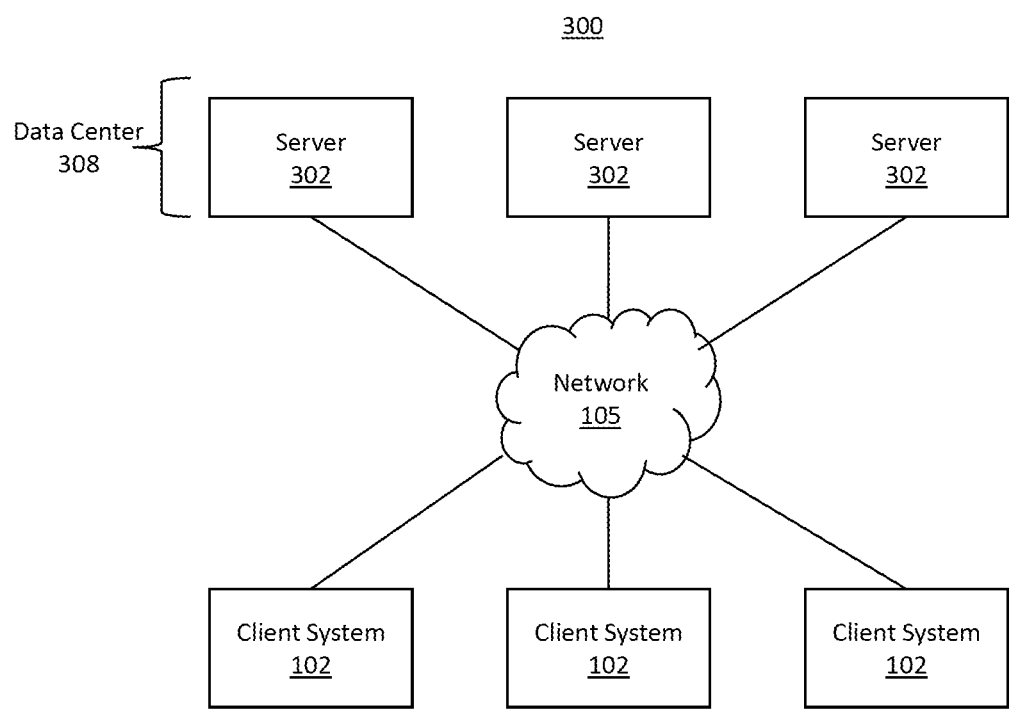
FIG. 3A is a block diagram depicting an implementation of a network environment including a client device in communication with a server device, in accordance with some embodiments of the present disclosure.

FIG. 3A depicts an example network environment that can be used in connection with the methods and systems described herein. In brief overview, the network environment 300 includes one or more client devices 102 (also generally referred to as clients, client node, client machines, client computers, client computing devices, endpoints, or endpoint nodes) in communication with one or more servers 302 (also generally referred to as servers, nodes, or remote machine) via one or more networks 105. In some embodiments, a client system 102 has the capacity to function as both a client node seeking access to resources provided by a server and as a server providing access to hosted resources for other client systems 102.

Although FIG. 3A shows a network 105 between the client systems 102 and the servers 302, the client systems 102 and the servers 302 can be on the same network 105. In embodiments, there are multiple networks 105 between the client systems 102 and the servers 302. The network 105 can include multiple networks such as a private network and a public network. The network 105 can include multiple private networks.

The network 105 can include one or more component or functionality of network 105 depicted in FIG. 3A. The network 105 can be connected via wired or wireless links. Wired links can include Digital Subscriber Line (DSL), coaxial cable lines, optical fiber lines, shielded twisted pairs, or unshielded twisted pairs. The wired links can connect one or more Ethernet networks. The wireless links can include BLUETOOTH, Wi-Fi, Worldwide Interoperability for Microwave Access (WiMAX), an infrared channel or satellite band. The wireless links can also include any cellular network standards used to communicate among mobile devices, including standards that qualify as 1G, 2G, 3G, 4G, 5G or other standards. The network standards can qualify as one or more generation of mobile telecommunication standards by fulfilling a specification or standards such as the specifications maintained by International Telecommunication Union. Examples of cellular network standards include AMPS, GSM, GPRS, UMTS, LTE, LTE Advanced, Mobile WiMAX, and WiMAX-Advanced. Cellular network standards can use various channel access methods e.g. FDMA, TDMA, CDMA, or SDMA. In some embodiments, different types of data can be transmitted via different links and standards. In other embodiments, the same types of data can be transmitted via different links and standards.

The network 105 can be any type and/or form of network. The geographical scope of the network 105 can vary widely and the network 105 can be a body area network (BAN), a personal area network (PAN), a local-area network (LAN), e.g., Intranet, a metropolitan area network (MAN), a wide area network (WAN), or the Internet. The topology of the network 105 can be of any form and can include, e.g., any of the following: point-to-point, bus, star, ring, mesh, or tree. The network 105 can be an overlay network which is virtual and sits on top of one or more layers of other networks 105. The network 105 can be of any such network topology as known to those ordinarily skilled in the art capable of supporting the operations described herein. The network 105 can utilize different techniques and layers or stacks of protocols, including, e.g., the Ethernet protocol or the internet protocol suite (TCP/IP). The TCP/IP internet protocol suite can include application layer, transport layer, internet layer (including, e.g., IPv6), or the link layer. The network 105 can be a type of a broadcast network, a telecommunications network, a data communication network, or a computer network.

The network environment 300 can include multiple, logically grouped servers 302. The logical group of servers can be referred to as a data center 308 (or server farm or machine farm). In embodiments, the servers 302 can be geographically dispersed. The data center 308 can be administered as a single entity or different entities. The data center 308 can include multiple data centers 308 that can be geographically dispersed. The servers 302 within each data center 308 can be homogeneous or heterogeneous (e.g., one or more of the servers 302 or machines 302 can operate according to one type of operating system platform (e.g., WINDOWS), while one or more of the other servers 302 can operate on according to another type of operating system platform (e.g., Unix, Linux, or Mac OS)). The servers 302 of each data center 308 do not need to be physically proximate to another server 302 in the same machine farm 308. Thus, the group of servers 302 logically grouped as a data center 308 can be interconnected using a network. Management of the data center 308 can be de-centralized. For example, one or more servers 302 can comprise components, subsystems and modules to support one or more management services for the data center 308.

Server 302 can be a file server, application server, web server, proxy server, appliance, network appliance, gateway, gateway server, virtualization server, deployment server, SSL VPN server, or firewall. In embodiments, the server 302 can be referred to as a remote machine or a node. Multiple nodes can be in the path between any two communicating servers.

Figure 3B:
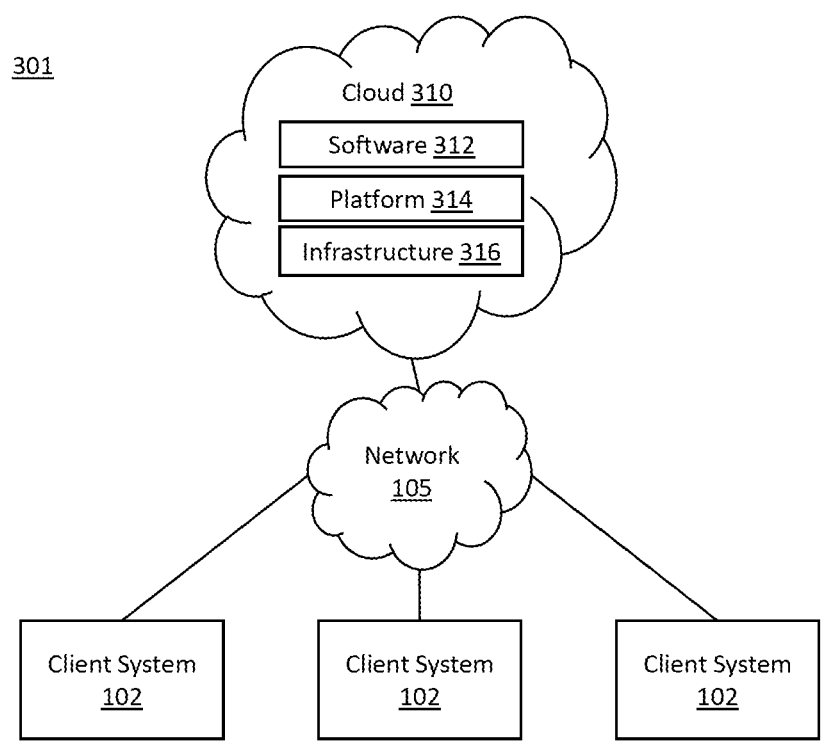
FIG. 3B is a block diagram depicting a cloud computing environment including a client device in communication with cloud service providers, in accordance with some embodiments of the present disclosure.

FIG. 3B illustrates an example cloud computing environment. A cloud computing environment 301 can provide client system 102 with one or more resources provided by a network environment. The cloud computing environment 301 can include one or more client systems 102, in communication with the cloud 310 over one or more networks 105. Client systems 102 can include, e.g., thick clients, thin clients, and zero clients. A thick client can provide at least some functionality even when disconnected from the cloud 310 or servers 302. A thin client or a zero client can depend on the connection to the cloud 310 or server 302 to provide functionality. A zero client can depend on the cloud 310 or other networks 105 or servers 302 to retrieve operating system data for the client device. The cloud 310 can include back-end platforms, e.g., servers 302, storage, server farms or data centers.

The cloud 310 can be public, private, or hybrid. Public clouds can include public servers 302 that are maintained by third parties to the client systems 102 or the owners of the clients. The servers 302 can be located off-site in remote geographical locations as disclosed above or otherwise. Public clouds can be connected to the servers 302 over a public network. Private clouds can include private servers 302 that are physically maintained by client systems 102 or owners of clients. Private clouds can be connected to the servers 302 over a private network 105. Hybrid clouds can include both the private and public networks 105 and servers 302.

The cloud 310 can also include a cloud-based delivery, e.g. Software as a Service (SaaS) 312, Platform as a Service (PaaS) 314, and Infrastructure as a Service (IaaS) 316. IaaS can refer to a user renting the use of infrastructure resources that are needed during a specified time period. IaaS providers can offer storage, networking, servers or virtualization resources from large pools, allowing the users to quickly scale up by accessing more resources as needed. PaaS providers can offer functionality provided by IaaS, including, e.g., storage, networking, servers or virtualization, as well as additional resources such as, e.g., the operating system, middleware, or runtime resources. SaaS providers can offer the resources that PaaS provides, including storage, networking, servers, virtualization, operating system, middleware, or runtime resources. In some embodiments, SaaS providers can offer additional resources including, e.g., data and application resources.

Client systems 102 can access IaaS resources, SaaS resources, or PaaS resources. In embodiments, access to IaaS, PaaS, or SaaS resources can be authenticated. For example, a server or authentication server can authenticate a user via security certificates, HTTPS, or API keys. API keys can include various encryption standards such as, e.g., Advanced Encryption Standard (AES). Data resources can be sent over Transport Layer Security (TLS) or Secure Sockets Layer (SSL).

The client system 102 and server 302 can be deployed as and/or executed on any type and form of computing device, e.g., a computer, network device or appliance capable of communicating on any type and form of network and performing the operations described herein.

Figure 3C:
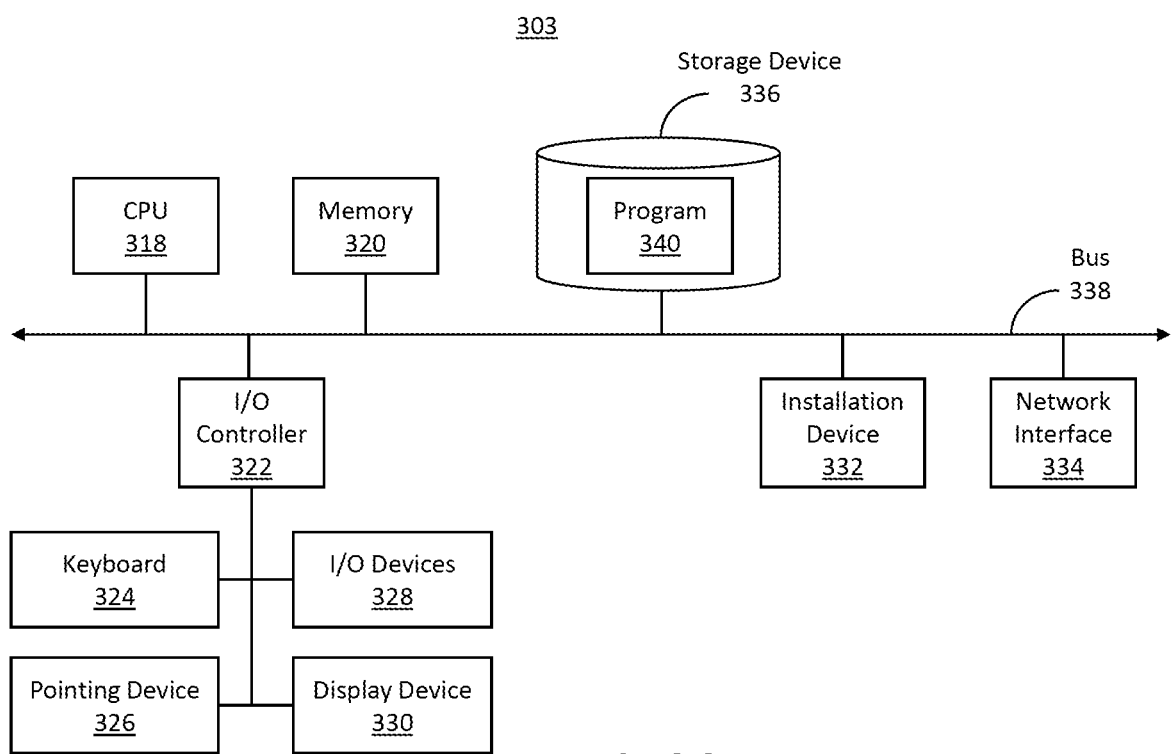
FIG. 3C is a block diagram depicting an implementation of a computing device that can be used in connection with the systems depicted in FIGS. 1, 3A and 3B, and the methods depicted in FIGS. 2A and 2B, in accordance with some embodiments of the present disclosure.

FIG. 3C depicts block diagrams of a computing device 303 useful for practicing an embodiment of the client system 102 or a server 302. As shown in FIG. 3C, each computing device 303 can include a central processing unit 318, and a main memory unit 320. As shown in FIG. 3C, a computing device 303 can include one or more of a storage device 336, an installation device 332, a network interface 334, an I/O controller 322, a display device 330, a keyboard 324 or a pointing device 326, e.g. a mouse. The storage device 336 can include, without limitation, a program, such as an operating system, software, or software associated with system 100.

The central processing unit 318 is any logic circuitry that responds to and processes instructions fetched from the main memory unit 320. The central processing unit 318 can be provided by a microprocessor unit. The computing device 303 can be based on any of these processors, or any other processor capable of operating as described herein. The central processing unit 318 can utilize instruction level parallelism, thread level parallelism, different levels of cache, and multi-core processors. A multi-core processor can include two or more processing units on a single computing component.

Main memory unit 320 can include one or more memory chips capable of storing data and allowing any storage location to be directly accessed by the microprocessor 318. Main memory unit 320 can be volatile and faster than storage 336 memory. Main memory units 320 can be Dynamic random access memory (DRAM) or any variants, including static random access memory (SRAM). The memory 320 or the storage 336 can be non-volatile; e.g., non-volatile read access memory (NVRAM). The memory 320 can be based on any type of memory chip, or any other available memory chips. In the example depicted in FIG. 3C, the processor 318 can communicate with memory 320 via a system bus 338.

A wide variety of I/O devices 328 can be present in the computing device 303. Input devices 328 can include keyboards, mice, trackpads, trackballs, touchpads, touch mice, multi-touch touchpads and touch mice, microphones, multi-array microphones, drawing tablets, cameras, or other sensors. Output devices 328 can include video displays, graphical displays, speakers, headphones, or printers.

I/O devices 328 can have both input and output capabilities, including, e.g., haptic feedback devices, touchscreen displays, or multi-touch displays. Touchscreen, multi-touch displays, touchpads, touch mice, or other touch sensing devices can use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices can allow two or more contact points with the surface, allowing advanced functionality including, e.g., pinch, spread, rotate, scroll, or other gestures. Some touchscreen devices can have larger surfaces, such as on a table-top or on a wall and can also interact with other electronic devices. Some I/O devices 328, display devices 330 or group of devices can be augmented reality devices. The I/O devices can be controlled by an I/O controller 322 as shown in FIG. 3C. The I/O controller 322 can control one or more I/O devices, such as, e.g., a keyboard 324 and a pointing device 326, e.g., a mouse or optical pen. Furthermore, an I/O device can also provide storage and/or an installation device 332 for the computing device 303. In embodiments, the computing device 303 can provide USB connections (not shown) to receive handheld USB storage devices. In embodiments, an I/O device 328 can be a bridge between the system bus 338 and an external communication bus, e.g. a USB bus, a SCSI bus, a FireWire bus, an Ethernet bus, a Gigabit Ethernet bus, a Fibre Channel bus, or a Thunderbolt bus.

In embodiments, display devices 330 can be connected to I/O controller 322. Display devices can include, e.g., liquid crystal displays (LCD), electronic papers (e-ink) displays, flexile displays, light emitting diode displays (LED), or other types of displays. In some embodiments, display devices 330 or the corresponding I/O controllers 322 can be controlled through or have hardware support for OPENGL or DIRECTX API or other graphics libraries. Any of the I/O devices 328 and/or the I/O controller 322 can include any type and/or form of suitable hardware, software, or combination of hardware and software to support, enable or provide for the connection and use of one or more display devices 330 by the computing device 303. For example, the computing device 303 can include any type and/or form of video adapter, video card, driver, and/or library to interface, communicate, connect or otherwise use the display devices 330. In embodiments, a video adapter can include multiple connectors to interface to multiple display devices 330.

The computing device 303 can include a storage device 336 (e.g., one or more hard disk drives or redundant arrays of independent disks) for storing an operating system or other related software, and for storing application software programs such as any program related to the systems, methods, components, modules, elements, or functions depicted in FIG. 1 or 2. Examples of storage device 336 include, e.g., hard disk drive (HDD); optical drive including CD drive, DVD drive, or BLU-RAY drive; solid-state drive (SSD); USB flash drive; or any other device suitable for storing data. Storage devices 336 can include multiple volatile and non-volatile memories, including, e.g., solid state hybrid drives that combine hard disks with solid state cache. Storage devices 336 can be non-volatile, mutable, or read-only. Storage devices 336 can be internal and connect to the computing device 303 via a bus 338. Storage device 336 can be external and connect to the computing device 303 via an I/O device 328 that provides an external bus. Storage device 336 can connect to the computing device 303 via the network interface 334 over a network 105. Some client devices 102 may not require a non-volatile storage device 336 and can be thin clients or zero client systems 102. Some storage devices 336 can be used as an installation device 332 and can be suitable for installing software and programs.

The computing device 303 can include a network interface 334 to interface to the network 105 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac/ax, CDMA, GSM, WiMax and direct asynchronous connections). The computing device 303 can communicate with other computing devices 303 via any type and/or form of gateway or tunneling protocol e.g., Secure Socket Layer (SSL), Transport Layer Security (TLS), or QUIC protocol. The network interface 334 can include a built-in network adapter, network interface card, PCMCIA network card, EXPRESS-CARD network card, card bus network adapter, wireless network adapter, USB network adapter, modem or any other device suitable for interfacing the computing device 303 to any type of network capable of communication and performing the operations described herein.

A computing device 303 of the sort depicted in FIG. 3C can operate under the control of an operating system, which controls scheduling of tasks and access to system resources. The computing device 303 can be running any operating system configured for any type of computing device, including, for example, a desktop operating system, a mobile device operating system, a tablet operating system, or a smartphone operating system.

The computing device 303 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computing device 303 has sufficient processor power and memory capacity to perform the operations described herein. In some embodiments, the computing device 303 can have different processors, operating systems, and input devices consistent with the device.

In embodiments, the status of one or more machines (e.g., client devices 102 and servers 302) in the network 105 can be monitored as part of network management. In embodiments, the status of a machine can include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information can be identified by a plurality of metrics, and the plurality of metrics can be applied at least in part towards decisions in load distribution, network traffic management, and network failure recovery as well as any aspects of operations of the present solution described herein.

The processes, systems and methods described herein can be implemented by the computing device 303 in response to the CPU 318 executing an arrangement of instructions contained in main memory 320. Such instructions can be read into main memory 320 from another computer-readable medium, such as the storage device 336. Execution of the arrangement of instructions contained in main memory 320 causes the computing device 303 to perform the illustrative processes described herein. One or more processors in a multi-processing arrangement may also be employed to execute the instructions contained in main memory 320. Hard-wired circuitry can be used in place of or in combination with software instructions together with the systems and methods described herein. Systems and methods described herein are not limited to any specific combination of hardware circuitry and software.

Although an example computing system has been described in FIG. 3C, the subject matter including the operations described in this specification can be implemented in other types of digital electronic circuitry, or in computer software, firmware, or hardware, including the structures disclosed in this specification and their structural equivalents, or in combinations of one or more of them.

It is to be understood that any examples used herein are simply for purposes of explanation and are not intended to be limiting in any way.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the disclosure be defined by the claims appended hereto and their equivalents.

What is claimed:

1. An apparatus comprising a processor and a memory, wherein the memory includes programmed instructions that, when executed by the processor, cause the apparatus to:
    identify a first virtual machine (VM) and a second VM having characteristics corresponding to a security policy;
    apply a category to the first VM and the second VM;
    schedule the first VM and the second VM to be placed on a same host at least based on the first VM and the second VM including the category; and
    apply the security policy to the first VM and the second VM at the same host after the first VM and the second VM are placed on the same host at least based on the first VM and the second VM including the category, the security policy identifying permissible network traffic for the first VM and the second VM.

2. The apparatus of claim 1, wherein the memory includes the programmed instructions that, when executed by the processor, further cause the apparatus to:
    apply the security policy to the first VM and the second VM responsive to the first VM and the second VM being placed on the same host.

3. The apparatus of claim 1, wherein the memory includes the programmed instructions that, when executed by the processor, further cause the apparatus to:
    schedule the first VM and the second VM to be placed on the same host at least based on determining that no anti-affinity policies prevent the first VM and the second VM from being on the same host.

4. The apparatus of claim 1, wherein the security policy includes a policy identifying at least one of permissible inbound traffic or permissible outbound traffic.

5. A non-transitory computer readable storage medium comprising instructions stored thereon that, when executed by a processor, cause the processor to:
  identify a first virtual machine (VM) and a second VM having characteristics corresponding to a security policy;
  apply a category to the first VM and the second VM;
  schedule the first VM and the second VM to be placed on a same host at least based on the first VM and the second VM including the category; and
  apply the security policy to the first VM and the second VM at the same host after the first VM and the second VM are placed on the same host at least based on the first VM and the second VM including the category, the security policy identifying permissible network traffic for the first VM and the second VM.

6. The medium of claim 5, comprising the instructions stored thereon that, when executed by a processor, further cause the processor to:
  apply the security policy to the first VM and the second VM responsive to the first VM and the second VM being placed on the same host.

7. The medium of claim 5, comprising the instructions stored thereon that, when executed by a processor, further cause the processor to:
  schedule the first VM and the second VM to be placed on the same host at least based on determining that no anti-affinity policies prevent the first VM and the second VM from being on the same host.

8. The medium of claim 5, wherein the security policy includes a policy identifying at least one of permissible inbound traffic or permissible outbound traffic.

9. A computer-implemented method comprising:
  identifying, by a processor, a first virtual machine (VM) and a second VM having characteristics corresponding to a security policy;
  applying, by the processor, a category to the first VM and the second VM;
  scheduling, by the processor, the first VM and the second VM to be placed on a same host at least based on the first VM and the second VM including the category; and
  applying, by the processor, the security policy to the first VM and the second VM at the same host after the first VM and the second VM are placed on the same host at least based on the first VM and the second VM including the category, the security policy identifying permissible network traffic for the first VM and the second VM.

10. The method of claim 9, further comprising:
  applying the security policy to the first VM and the second VM responsive to the first VM and the second VM being placed on the same host.

11. The method of claim 9, further comprising:
  scheduling the first VM and the second VM to be placed on the same host at least based on determining that no anti-affinity policies prevent the first VM and the second VM from being on the same host.

12. The method of claim 9, wherein the security policy includes a policy identifying at least one of permissible inbound traffic or permissible outbound traffic.

13. An apparatus comprising a processor and a memory, wherein the memory includes programmed instructions that, when executed by the processor, cause the apparatus to:
  identify a first virtual machine (VM) and a second VM having characteristics corresponding to a security policy;
  apply a category to the first VM hosted on a first host and the second VM hosted on a second host;
  migrate one of the first VM or the second VM such that the first VM and the second VM are on a same host at least based on the first VM and the second VM including the category; and
  apply the security policy to the first VM and the second VM at the same host after the first VM and the second VM are placed on the same host at least based on the first VM and the second VM including the category, the security policy identifying permissible network traffic for the first VM and the second VM.

14. The apparatus of claim 13, wherein the memory includes the programmed instructions that, when executed by the processor, further cause the apparatus to: apply the security policy to the first VM and the second VM responsive to migrating one of the first VM or the second VM such that the first VM and the second VM are on the same host.

15. The apparatus of claim 13, wherein the memory includes the programmed instructions that, when executed by the processor, further cause the apparatus to:
  migrate one of the first VM or the second VM such that the first VM and the second VM are on the same host at least based on determining that no anti-affinity policies prevent the first VM and the second VM from being on the host.

* * * * *